US012540654B2

(12) United States Patent
Forbes et al.

(10) Patent No.: US 12,540,654 B2
(45) Date of Patent: Feb. 3, 2026

(54) CABLE TERMINAL END CINCH TOOLS AND METHODS

(71) Applicant: BNSF Railway Company, Fort Worth, TX (US)

(72) Inventors: Warren D. Forbes, Sidney, IA (US); Edward W. Lippold, Rulo, NE (US)

(73) Assignee: BNSF Railway Company, Fort Worth, TX (US)

( * ) Notice: Subject to any disclaimer, the term of this patent is extended or adjusted under 35 U.S.C. 154(b) by 214 days.

(21) Appl. No.: 18/407,965

(22) Filed: Jan. 9, 2024

(65) Prior Publication Data

US 2025/0224018 A1 Jul. 10, 2025

(51) Int. Cl.
*F16G 11/04* (2006.01)
*F16G 11/06* (2006.01)

(52) U.S. Cl.
CPC .............. *F16G 11/04* (2013.01); *F16G 11/06* (2013.01)

(58) Field of Classification Search
CPC ........ F16G 11/04; F16G 11/06; F16G 11/048; F16G 11/14; F16G 11/12
See application file for complete search history.

(56) References Cited

U.S. PATENT DOCUMENTS

| 1,880,193 | A | * | 10/1932 | Blackburn | F16G 11/048 403/182 |
| 1,906,367 | A | * | 5/1933 | Camp | B61H 13/04 403/211 |
| 3,007,243 | A | * | 11/1961 | Peterson | F16G 11/048 174/DIG. 12 |
| 3,276,237 | A | * | 10/1966 | Transue | B21D 1/145 72/305 |

(Continued)

FOREIGN PATENT DOCUMENTS

| CN | 209411624 U | 12/2018 |
| CN | 218021838 U | 9/2022 |
| DE | 684378 C | 11/1939 |

OTHER PUBLICATIONS

Mennens Group; (Jul. 7, 2014). The Lifting Knowhow SO1E08 Wire Rope Fittings Wedge Socket [Video]. https://www.youtube.com/watch?v=IM2QQZ8XyiU.

(Continued)

*Primary Examiner* — David M Upchurch
(74) *Attorney, Agent, or Firm* — Whitaker Chalk Swindle & Schwartz PLLC; Enrique Sanchez, Jr.

(57) ABSTRACT

An apparatus for applying a terminal end of a cable includes a base plate having a threaded rod support, and a threaded rod inserted through an aperture of the threaded rod support. The apparatus further includes an anchor coupled to the base plate and configured to couple a terminal end body of a cable to the apparatus, and a cinch trolly slidebly coupled to the (Continued)

base plate via a groove. The cinch trolly includes a protrusion configured to couple a cable pulling clamp to the cinch trolly, and one or more threaded nuts configured to threadably couple the cinch trolly to the threaded rod. The cinch trolly is configured to move along the groove away from the anchor when the threaded rod is rotated, thereby pulling the cable away from the anchor via the cable pulling clamp and thereby cinching the cable and a wedge within the terminal end body.

20 Claims, 10 Drawing Sheets

(56) References Cited

U.S. PATENT DOCUMENTS

| | | | | | |
|---|---|---|---|---|---|
| 3,905,711 | A | * | 9/1975 | Rogers | F16G 11/048 24/115 M |
| 4,045,001 | A | * | 8/1977 | Harvey, Jr. | B66D 1/36 242/157.1 |
| 4,643,378 | A | * | 2/1987 | Guthrie | A63B 29/024 248/231.9 |
| 4,832,289 | A | * | 5/1989 | Waggoner | A63B 29/024 248/231.9 |
| 5,938,469 | A | * | 8/1999 | Ford | F16G 11/048 439/459 |
| 8,424,846 | B1 | * | 4/2013 | Perduta | B66D 3/14 254/218 |
| 2025/0050193 | A1 | * | 2/2025 | Colombo | A63C 5/08 |

OTHER PUBLICATIONS

ASME; Mobile and Locomotive Cranes; Safety Standard for Cableways, Cranes, Derricks, Hoists, Hooks, Jacks, and Slings ; The American Society of Mechanical Engineers; 2014.

International Search Report and Written Opinion issued in PCT/US2025/010746 by the European Patent Office dated Apr. 24, 2025; 42 pages.

* cited by examiner

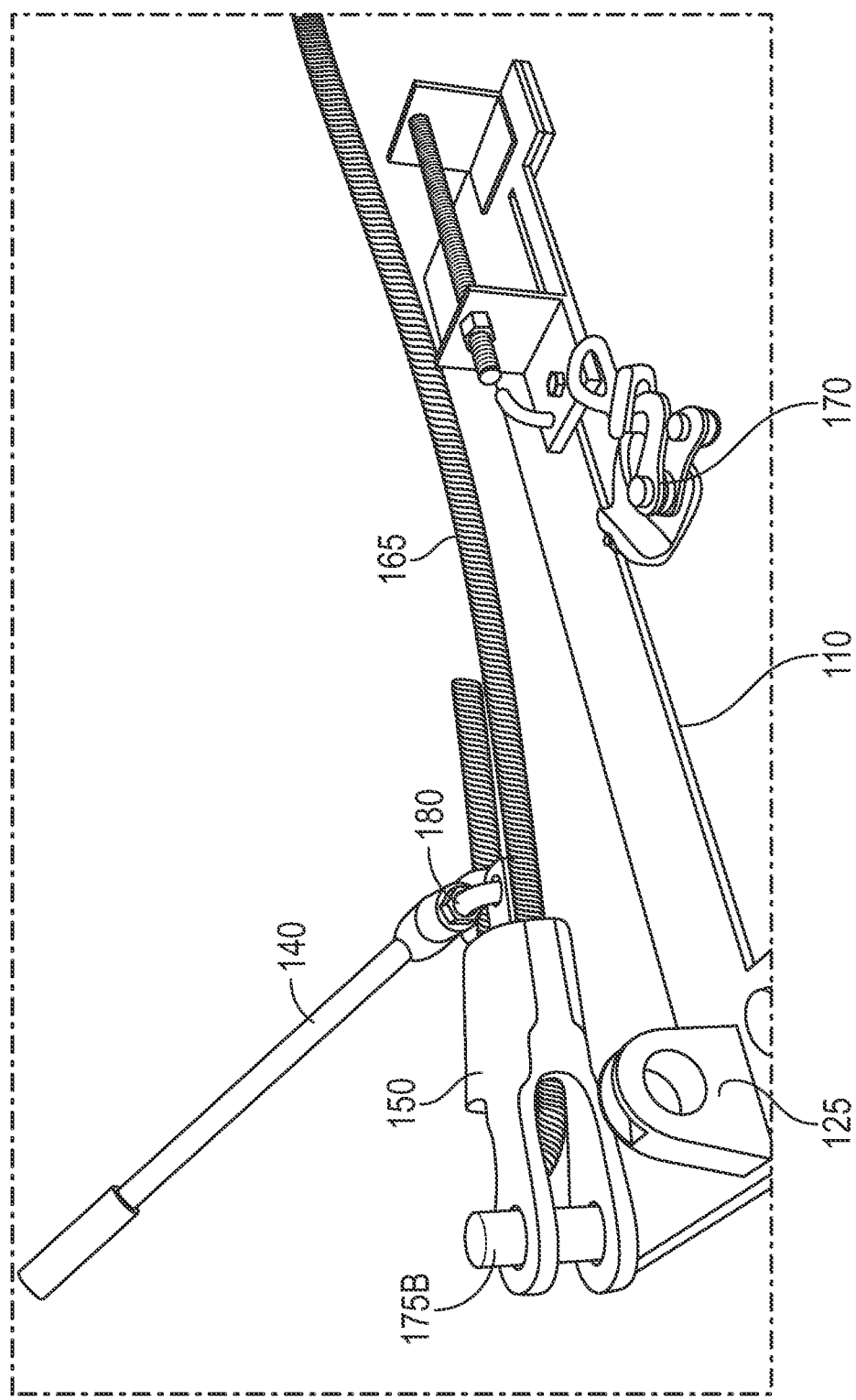

CABLE TERMINAL END CINCH TOOLS AND METHODS

TECHNICAL FIELD

The present disclosure relates generally to terminating cables, and more particularly to cable terminal end cinch tools and methods.

BACKGROUND

Cranes are utilized by many industries for many different tasks. For example, cranes are used by the railroad industry for construction and maintenance activities of the railroad. As another example, cranes are utilized in the commercial construction industry to lift and move heavy objects. Most cranes utilize wire cables with terminal ends. The terminal ends are attached to the end of the wire cables and are used to attach rigging to the cables. The attachment of a terminal end to a wire cable is a manual process that may be dangerous, time consuming, and physically demanding.

SUMMARY

The present disclosure achieves technical advantages as tools, systems, and methods for applying a terminal end to a cable. In some embodiments, an apparatus for applying a terminal end of a cable includes a base plate comprising a threaded rod support, and a threaded rod inserted through an aperture of the threaded rod support. The apparatus further includes an adapter coupled to a first end of the threaded rod and configured to couple a torque tool to the threaded rod. The apparatus further includes an anchor coupled to the base plate and configured to couple a terminal end body of a cable to the apparatus. The apparatus further includes a cinch trolly slidebly coupled to the base plate via a groove in the base plate. The cinch trolly includes a protrusion such as a hook that is configured to couple a cable pulling clamp to the cinch trolly. The cinch trolly further includes one or more threaded nuts configured to threadably couple the cinch trolly to the threaded rod. The cinch trolly is configured to move along the groove away from the anchor when the threaded rod is rotated by the torque tool, thereby pulling the cable away from the anchor via the cable pulling clamp and thereby cinching the cable and a wedge within the terminal end body.

In some embodiments, a system for applying a terminal end of a cable includes a terminal end body for a cable, a wedge configured to be inserted into the terminal end body, and a cable terminal end cinch tool. The cable terminal end cinch tool includes a base plate comprising a threaded rod support, and a threaded rod inserted through an aperture of the threaded rod support. The cable terminal end cinch tool further includes an adapter coupled to a first end of the threaded rod and configured to couple a torque tool to the threaded rod. The cable terminal end cinch tool further includes an anchor coupled to the base plate and configured to couple a terminal end body of a cable to the cable terminal end cinch tool. The cable terminal end cinch tool further includes a cinch trolly slidebly coupled to the base plate via a groove in the base plate. The cinch trolly includes a protrusion such as a hook that is configured to couple a cable pulling clamp to the cinch trolly. The cinch trolly further includes one or more threaded nuts configured to threadably couple the cinch trolly to the threaded rod. The cinch trolly is configured to move along the groove away from the anchor when the threaded rod is rotated by the torque tool, thereby pulling the cable away from the anchor via the cable pulling clamp and thereby cinching the cable and a wedge within the terminal end body.

In some embodiments, a method of applying a terminal end to a cable includes coupling a terminal end body to an anchor of a cable terminal end cinch tool and then looping an end of a cable through the terminal end body. The method further includes inserting a wedge into the terminal end body and attaching a cable pulling clamp to the cable and to a cinch trolly of the cable terminal end cinch tool. The method further includes advancing the cinch trolly away from the anchor in order to cinch the cable and the wedge within the terminal end body and then applying a cable clamp to the cable. The method further includes removing the terminal end body from the anchor, placing the terminal end body on a torquing post of the cable terminal end cinch tool, and then applying a predetermined amount of torque to the cable clamp.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIGS. 1A-1E illustrate various views of a cable terminal end cinch system, according to certain embodiments;

Figure 1A:
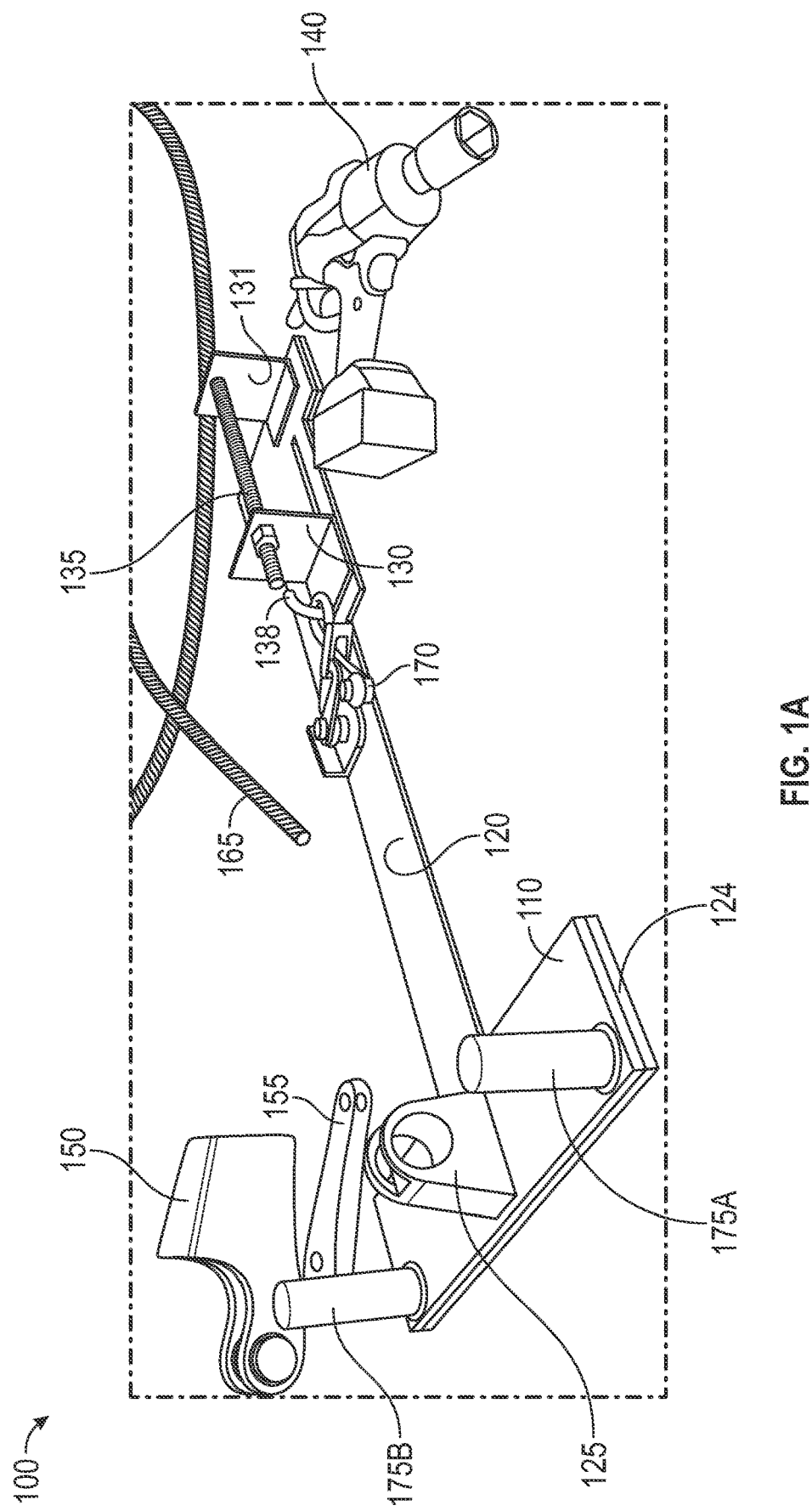

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Cranes are utilized by many industries for many different tasks. For example, cranes are used by the railroad industry for construction and maintenance activities of the railroad. As another example, cranes are utilized in the commercial construction industry to lift and move heavy objects. Most cranes utilize wire cables with terminal ends. The terminal ends are attached to the end of the wire cables and are used to attach rigging to the cables. The attachment of a terminal end to a wire cable is a manual process that may be dangerous, time consuming, and physically demanding.

To address these and other problems associated with attaching terminal ends to a cable, the enclosed embodiments provide systems, apparatuses, and methods for applying a terminal end to a cable. In general, the disclosed embodiments utilize a cable terminal end cinch tool that includes a base plate and a threaded rod inserted through an aperture of a threaded rod support of the base plate. The cable terminal end cinch tool further includes an anchor coupled to the base plate that is configured to couple a terminal end body of a cable to the cable terminal end cinch tool. The cable terminal end cinch tool further includes a cinch trolly slidebly coupled to the base plate via a groove in the base plate. The cinch trolly includes a protrusion such as a hook that is configured to couple a cable pulling clamp to the cinch trolly. The cinch trolly further includes one or more threaded nuts configured to threadably couple the cinch trolly to the threaded rod. The cinch trolly is configured to move along the groove away from the anchor when the threaded rod is rotated by the torque tool, thereby pulling the cable away from the anchor via the cable pulling clamp and thereby cinching the cable and a wedge within the terminal end body. As a result, the terminal end body may be more easily applied to the cable than existing methods, thereby increasing safety, saving time, and decreasing physical demands on operators.

FIGS. 1A-1E illustrate various views of a cable terminal end cinch system 100, according to certain embodiments. In some embodiments, cable terminal end cinch system 100 includes a cable terminal end cinch tool 110, a terminal end body 150, a wedge 155, and a cable clamp 180. In general, cable terminal end cinch tool 110 may be used to easily, safely, and efficiently apply terminal end body 150 and wedge 155 to a cable 165, as described in more detail below.

In some embodiments, cable terminal end cinch tool 110 includes a base plate 120. Base plate 120 is shown in more details in FIG. 2-3. In some embodiments, base plate 120 is a flat piece of metal (e.g., ⅜" thick) in the shape of a "T" and includes two end members 121A and 121B and a spine member 123. End members 121A and 121B are generally parallel to each other and are connected by spine member 123 that is generally perpendicular to end members 121. In some embodiments, end member 121A is longer than end member 121B as illustrated, but other embodiments may include end members 121 of any appropriate length. For example, end member 121A may be around eighteen inches in length and end member 121B may be around ten inches in length. In some embodiments, the overall length of base plate 120 may be between two and four feet in length, but other embodiments may be any appropriate length according to the desired application in order to accommodate six to eight inches of tail on cable 165. In general, end members 121 provide an operator with locations in which to stand in order to secure cable terminal end cinch tool 110 during operation.

In some embodiments, cable terminal end cinch tool 110 includes an anchor 125 coupled to base plate 120. A particular embodiment of anchor 125 is shown in more detail in FIGS. 4A-4D. In general, anchor 125 is configured to couple terminal end body 150 to cable terminal end cinch tool 110 using, for example, a pin 160. In some embodiments, anchor 125 is made from metal and includes two pin apertures 127 that are sized to accept pin 160. For example, pin apertures 127 may be approximately 1.75 inches in diameter to accommodate a terminal end body 150 sized for a ⅞-inch cable 165. Anchor 125 may be approximately three to four inches tall and may be approximately one to two inches wide. In some embodiments, anchor 125 may be coupled proximate to one end of base plate 120 as illustrated. For example, anchor 125 may be coupled to end member 121A. In some embodiments, anchor 125 is permanently coupled to base plate 120 via, for example, welding. In other embodiments, anchor 125 is removably coupled to base plate 120 via, for example, threaded posts, bolts, and the like. In some embodiments, anchor 125 includes a milled groove 126 as illustrated. Milled groove 126 may be any appropriate size in order to accept any size of cable 165 (e.g., approximately one inch in width for a ⅞-inch cable 165).

In some embodiments, cable terminal end cinch tool 110 includes a threaded rod support 131 coupled at an opposite end of base plate 120 from anchor 125 (e.g., on end member 121B). In general, threaded rod support 131 is a metal plate that is perpendicular to base plate 120. Threaded rod support 131 may be, for example, an angle bracket that is permanently coupled (e.g., via welding) to end member 121B of base plate 120 as illustrated.

In some embodiments, cable terminal end cinch tool 110 includes a threaded rod 135 inserted through an aperture of threaded rod support 131. Threaded rod 135 may be approximately one foot in length and may have any appropriate thread pattern. In some embodiments, threaded rod 135 includes an adapter 145 coupled to one end of threaded rod 135. Adapter 145 may be permanently or temporarily coupled to one end of threaded rod 135 and may function to secure threaded rod 135 within the aperture of threaded rod support 131. Adapter 145 is configured to couple a torque tool 140 (e.g., an impact drill) to threaded rod 135 and transfer torque from torque tool 140 to threaded rod 135. In some embodiments, adapter 145 is a nut that is welded onto an end of threaded rod 135. In some embodiments, cable terminal end cinch tool 110 includes an impact-compatible washer on threaded rod 135 between adapter 145 and threaded rod support 131.

In some embodiments, cable terminal end cinch tool 110 includes a cinch trolly 130 that is slidebly coupled to base plate 120 via a trolly groove 132 in base plate 120. A particular embodiment of cinch trolly 130 is shown in more detail in FIG. 5. In general, cinch trolly 130 is configured to move along trolly groove 132 away from anchor 125 when threaded rod 135 is rotated by torque tool 140, thereby pulling a live end of cable 165 away from anchor 125 via a cable pulling clamp 170 and thereby cinching cable 165 and wedge 155 within terminal end body 150. In some embodiments, cinch trolly 130 includes an angle bracket similar in shape to threaded rod support 131 (e.g., a portion that is parallel to base plate 120 and a portion that is perpendicular to base plate 120). Cinch trolly 130 also includes one or more threaded nuts 137 that are configured to threadably couple cinch trolly 130 to threaded rod 135. In some embodiments, cinch trolly 130 includes two threaded nuts 137 that are welded to opposite sides of cinch trolly 130 as illustrated.

In some embodiments, cinch trolly 130 includes a protrusion 138 that is configured to couple cable pulling clamp 170 to cinch trolly 130. Protrusion 138 may be, for example, a hook or an eye bolt that couples to an attachment point (e.g., a hook or loop) of cable pulling clamp 170. Protrusion 138 may be temporarily coupled (e.g., using bolts) or permanently coupled (e.g., via welding) to cinch trolly 130 and may be between one and two inches tall. In some embodiments, protrusion 138 is aligned with anchor 125 so that the cinching of cable 165 is as close as parallel with base plate 120 as possible (i.e., the cinching of cable 165 is parallel with a longitudinal centerline of spine member 123 of base plate 120).

Figure 5:
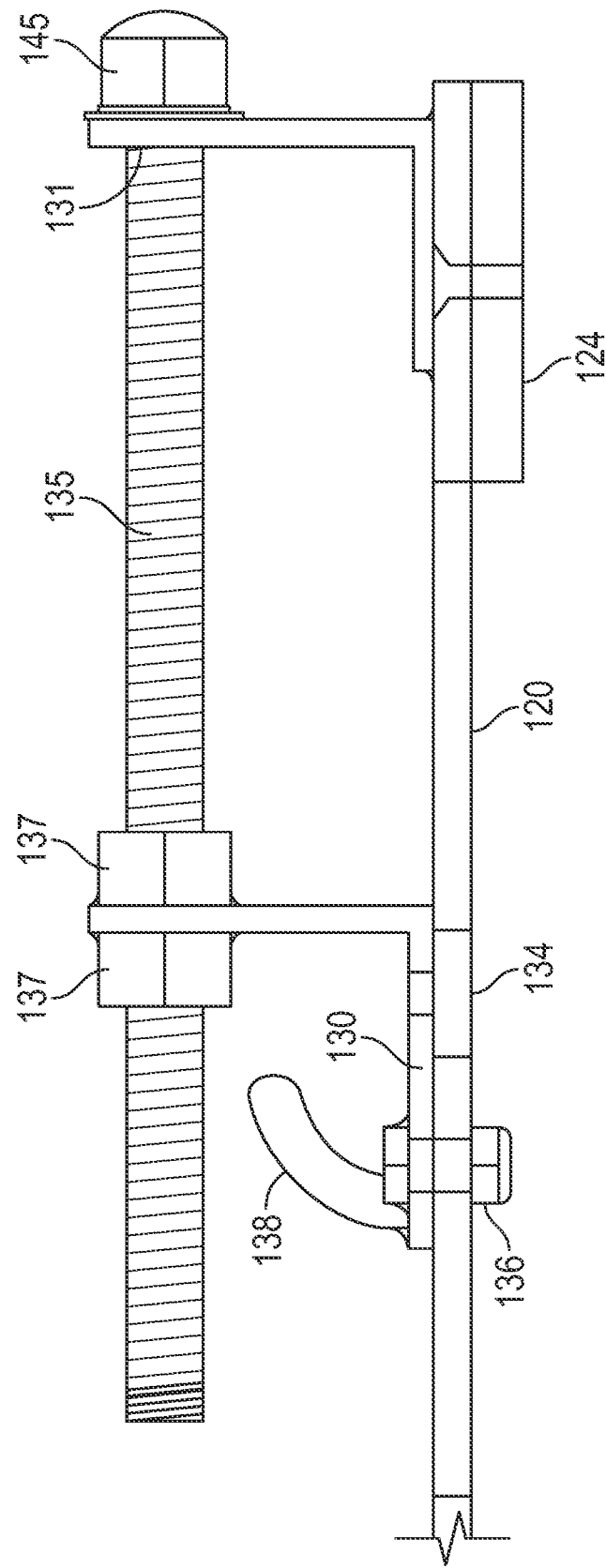
FIG. 5 illustrates a side view of a cinch trolly of a cable terminal end cinch tool, according to certain embodiments.

In some embodiments, cinch trolly 130 is slidebly coupled to base plate 120 with a bolt and lock nut 136 that passes through cinch trolly 130 and trolly groove 132. Some embodiments of cinch trolly 130 may additionally include a key 134 that is coupled to an underside of cinch trolly 130 as illustrated in FIG. 5. Key 134 may have any appropriate shape to fit into trolly groove 132 and guide cinch trolly 130 along trolly groove 132.

In some embodiments, cable terminal end cinch tool 110 includes one or more torquing posts 175. In the illustrated embodiments, for example, cable terminal end cinch tool 110 includes two torquing posts 175A and 175B that are located on opposite ends of end member 121A of base plate 120. In these embodiments, torquing post 175A may have a different diameter than torquing post 175B. Each torquing post 175 is configured to secure terminal end body 150 while a predetermined amount of torque is applied to cable clamp 180 attached to cable 165, as illustrated in FIG. 1E. Torquing post 175 may have a diameter that matches a diameter of pin 160 and may have any appropriate diameter in order to accommodate any size of terminal end body 150. Torquing posts 175 may either be permanently attached to end member 121A of base plate 120 (e.g., via welding) or be removably coupled to end member 121A (e.g., via bolts or threaded portions of torquing posts 175).

Figure 2:
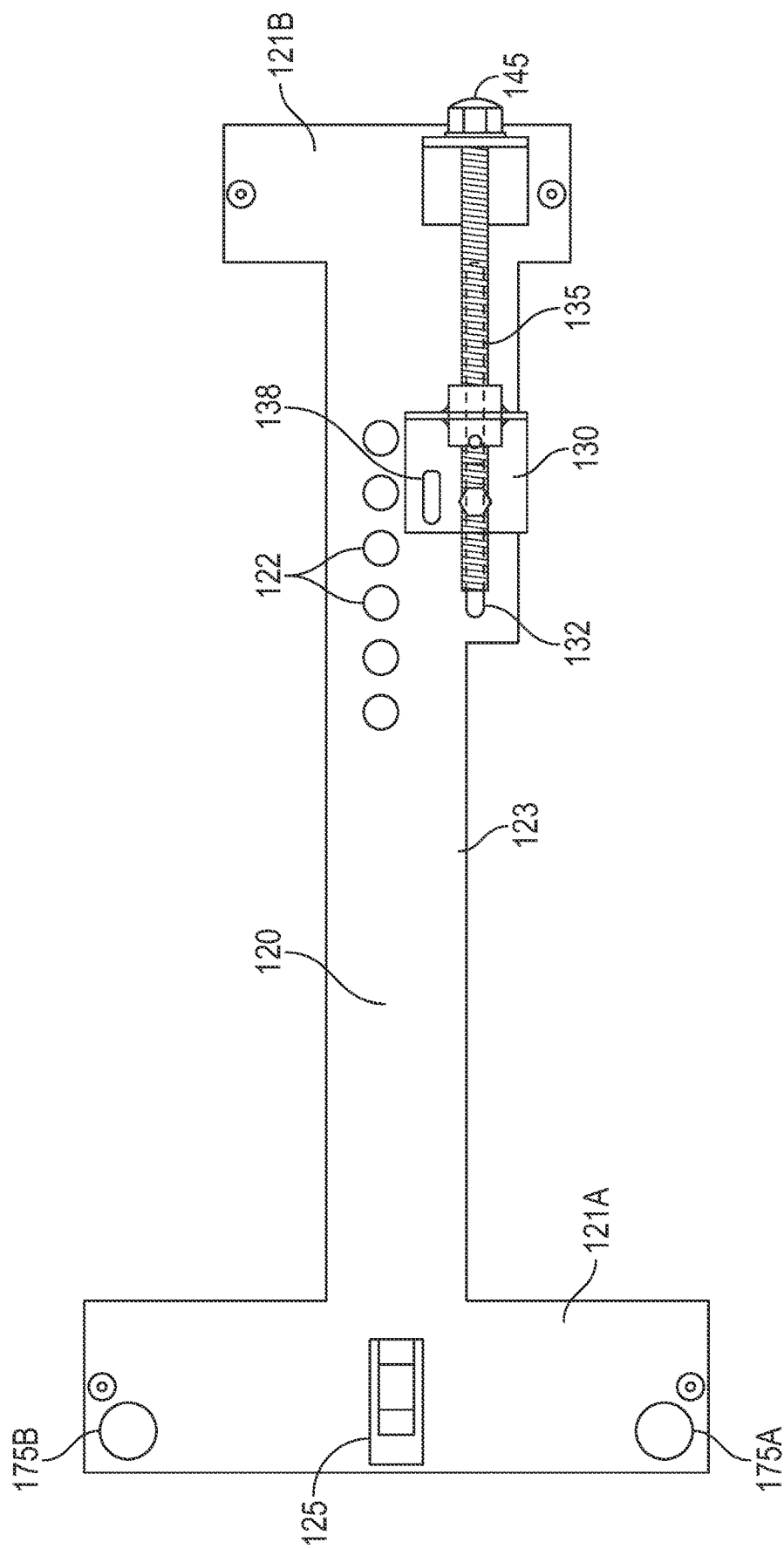
FIG. 2 illustrates a top-down view of a cable terminal end cinch tool of the system of FIGS. 1A-1E, according to certain embodiments.
Figure 3:
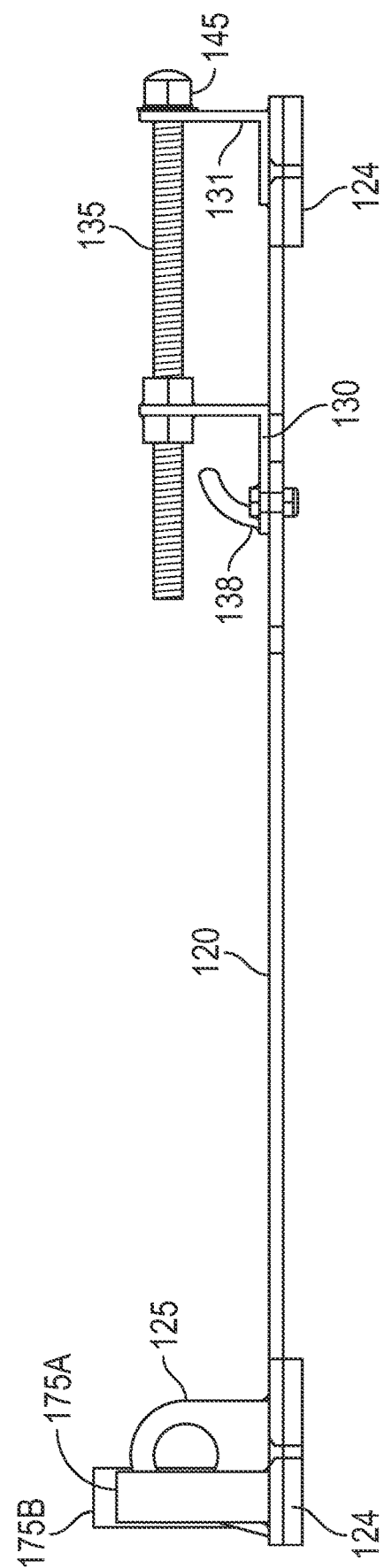
FIG. 3 illustrates a side view of the cable terminal end cinch tool of the system of FIGS. 1A-1E, according to certain embodiments.
Figure 4A:
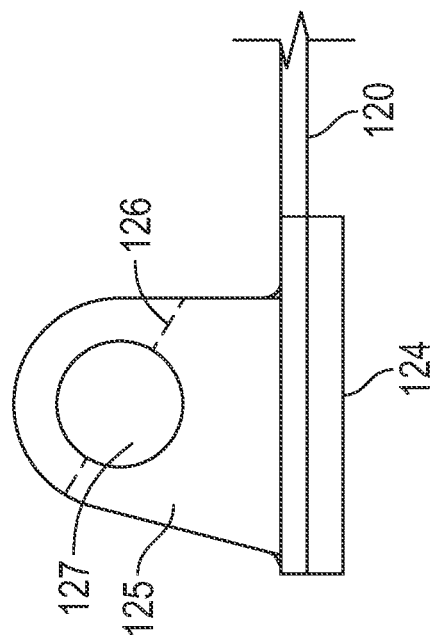
FIGS. 4A-4D illustrate various views of an anchor of a cable terminal end cinch tool, according to certain embodiments.
Figure 4C:
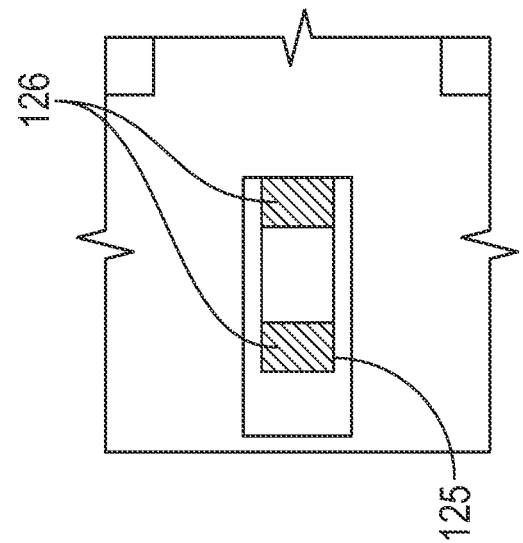
Figure 4B:
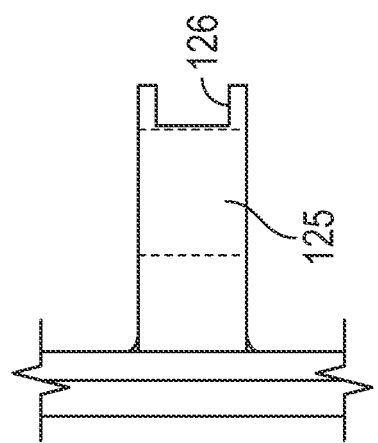
Figure 4D:
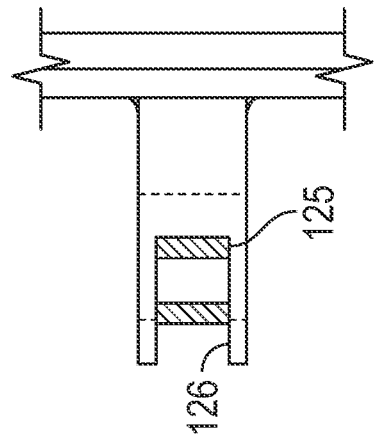

In some embodiments, base plate 120 includes holes 122 as illustrated in FIG. 2. In general, holes 122 in base plate 120 are configured to allow a bar (not illustrated) to be used to manually advance cable pulling clamp 170 away from anchor 125 and thereby cinch wedge 155 and cable 165 within terminal end body 150. Holes 122 may be used, for example, if torque tool 140 is unavailable or if threaded rod 135 becomes damaged. In some embodiments, holes 122 are spaced apart at one-inch intervals. Any appropriate number of holes 122 may be included on base plate 120 of cable terminal end cinch tool 110.

In some embodiments, cable terminal end cinch tool 110 includes feet 124 that are coupled to an underside of base plate 120 as illustrated best in FIGS. 2 and 5. In some embodiments, feet 124 are metal plates that are half an inch thick. In general, feet 124 elevate cable terminal end cinch tool 110 enough to permit cinch trolly 130 to slide along trolly groove 132.

Torque tool 140 is any tool that is capable of coupling to adapter 145 and rotating threaded rod 135 in order to slide cinch trolly 130 along trolly groove 132. In some embodiments, torque tool 140 may be any corded or cordless power tool. For example, torque tool 140 may be a cordless impact driver with a socket that matches the size of adapter 145. In some embodiments, torque tool 140 may be a wrench, a tire iron, and the like.

Terminal end body 150 and wedge 155 are components for terminating an end of cable 165. In general, one end of cable 165 is first passed through an end of terminal end body 150 that is facing cinch trolly 130, as illustrated in FIG. 1B. After the end of cable 165 is passed through terminal end body 150, wedge 155 is inserted into terminal end body 150 and on top of the portion of cable 165 that is within terminal end body 150. Finally, the end of cable 165 is looped back on top of wedge 155 and back through the end of terminal end body 150 that is facing cinch trolly 130. Cable terminal end cinch tool 110 is then used to cinch wedge 155 and cable 165 within terminal end body 150. In some embodiments, terminal end body 150 and wedge 155 are a TERMINATOR WEDGE SOCKET system by CROSBY.

Cable 165 is any appropriate cable of any appropriate size. In some embodiments, cable 165 is a wire cable of a crane. Cable 165 may be any size diameter (e.g., ⅝", ¾", ⅞", and the like).

Cable pulling clamp 170 is any device that is capable of temporarily attaching to and pulling cable 165. In some embodiments, cable pulling clamp 170 is a wire pulling tool from KLEIN (e.g., a Haven's Grip tool). In general, cable pulling clamp 170 has one portion for attaching to protrusion 138 (e.g., a hook or a loop) and one portion that attaches to and grips cable 165.

Cable clamp 180 is any appropriate cable clip or wire rope clamp that may be used to clamp the dead end of cable 165 to wedge 155, as illustrated in FIGURE ID. In some embodiments, cable clamp 180 includes two nuts that are tightened in order to secure cable clamp 180 to cable 165 and wedge 155. In some embodiments, the nuts of cable clamp 180 are the same size as adapter 145. As a result, the same torque tool 140 may be used to both both threaded rod 135 and install cable clamp 180 without changing sockets.

Figure 1B:
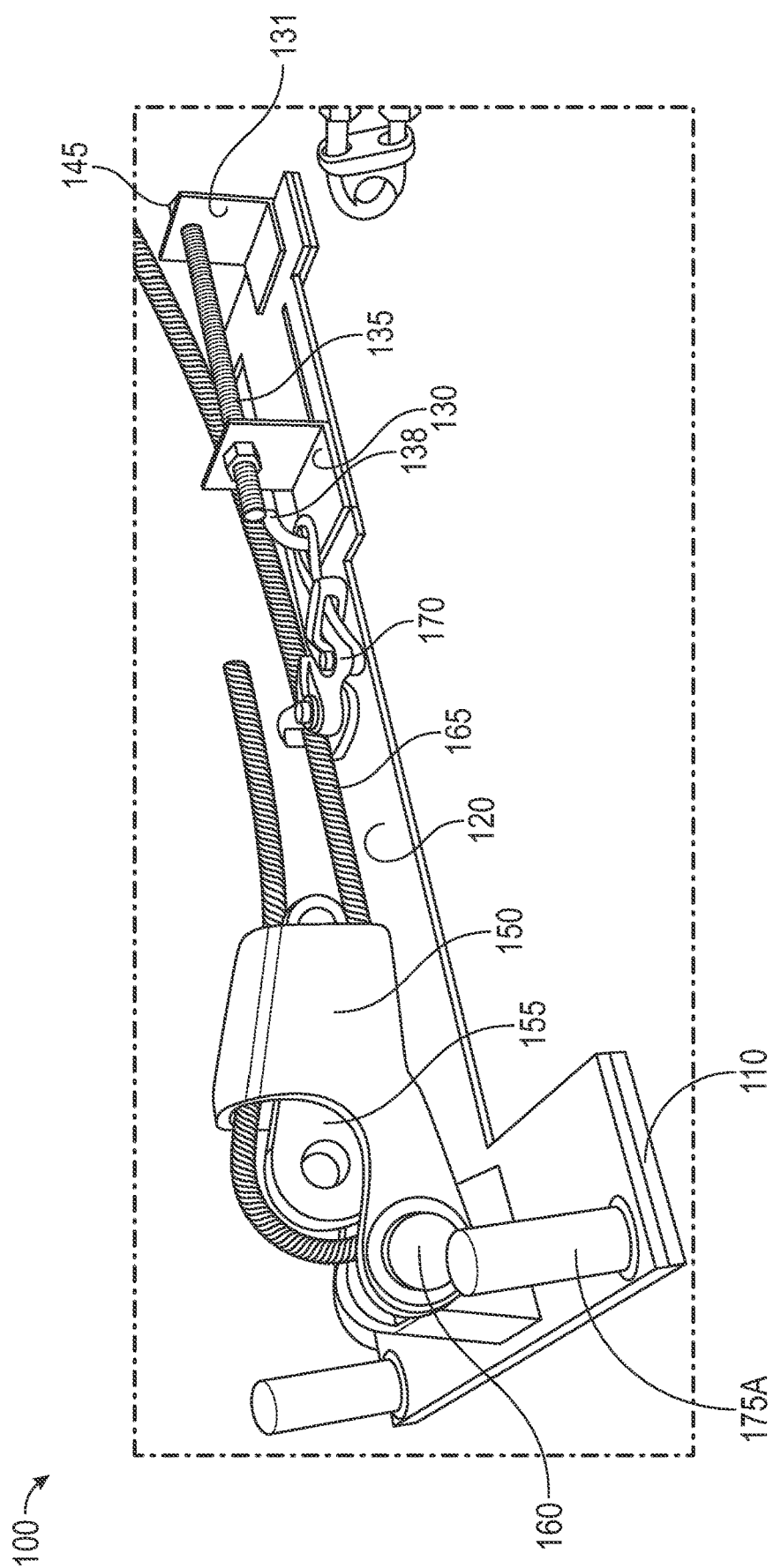
Figure 1C:
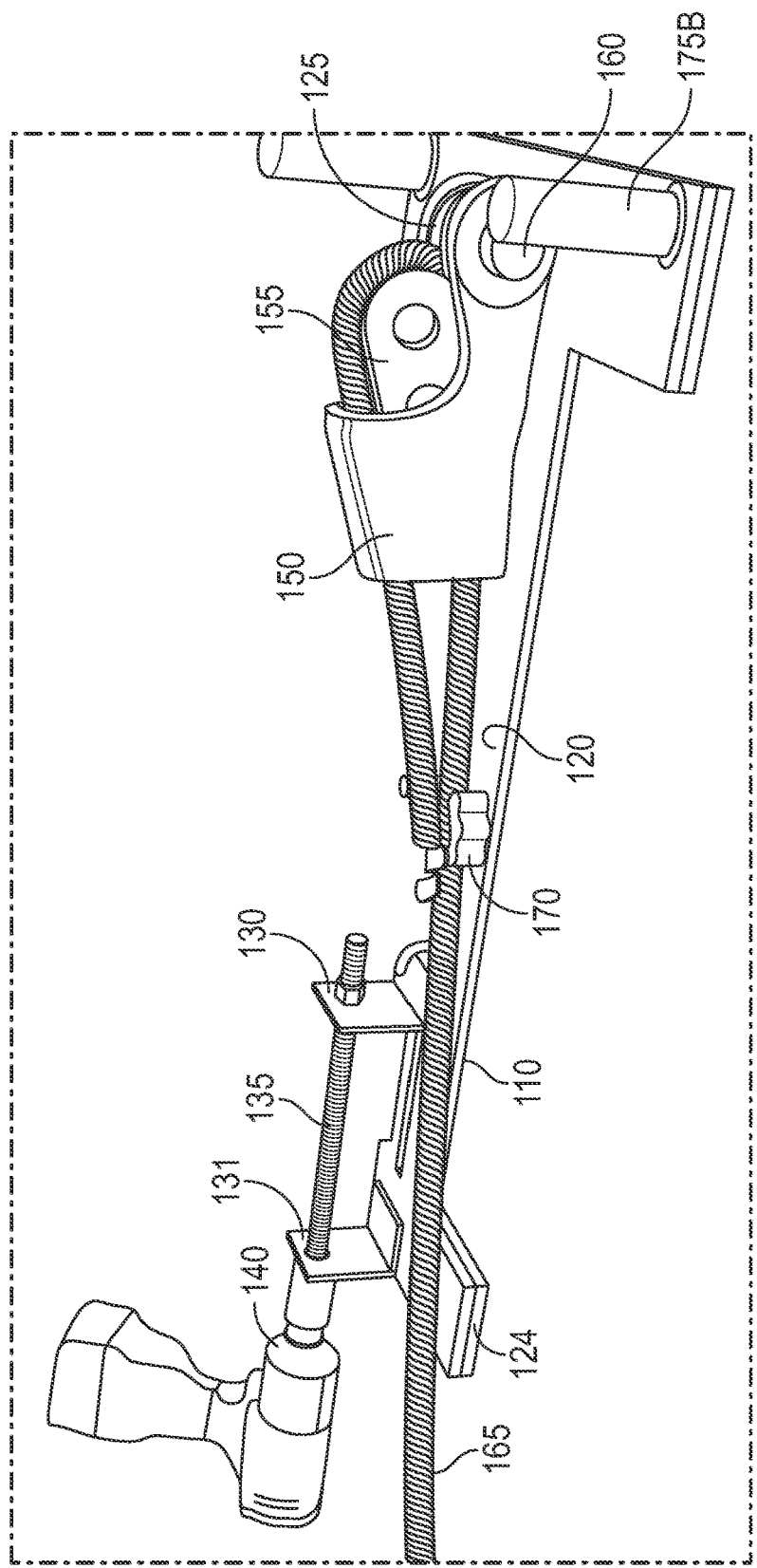
Figure 1D:
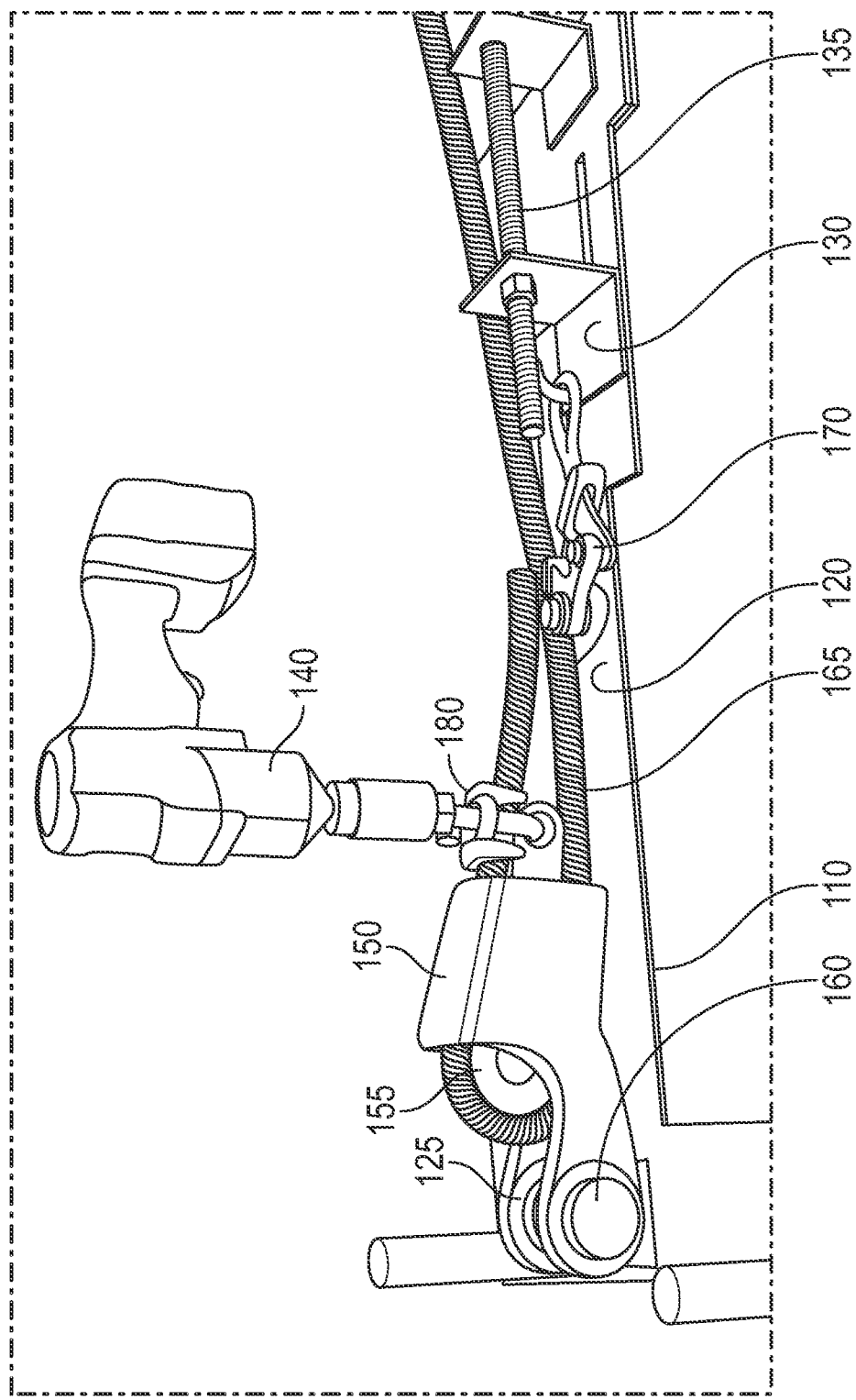

In operation and in reference to FIGS. 1A-1E, cable terminal end cinch tool 110 is used by cable terminal end cinch system 100 to cinch wedge 155 and cable 165 within terminal end body 150. First, as illustrated in FIGS. 1A and 1B, terminal end body 150 is attached to anchor 125 of cable terminal end cinch tool 110 using pin 160. Next, as illustrated in FIG. 1B, one end of cable 165 is passed through an end of terminal end body 150 that is facing cinch trolly 130. After the end of cable 165 is passed through terminal end body 150, wedge 155 is inserted into terminal end body 150 and on top of the portion of cable 165 that is within terminal end body 150. Finally, the end of cable 165 is looped back on top of wedge 155 and back through the end of terminal end body 150 that is facing cinch trolly 130. Next, cable pulling clamp 170 is attached to the live portion of cable 165 and protrusion 138 of cinch trolly 130. After cable pulling clamp 170 is attached to cable 165 and cinch trolly 130, torque tool 140 is used to rotate threaded rod 135 as illustrated in FIG. 1C. The rotation of threaded rod 135 by torque tool 140 causes cinch trolly 130 to advance through trolly groove 132 away from anchor 125, thereby cinching cable 165 and wedge 155 within terminal end body 150. After cable 165 and wedge 155 have been sufficiently cinched within terminal end body 150, cable clamp 180 is applied to the dead end of cable 165 and wedge 155 using torque tool 140, as illustrated in FIG. 1D. Finally, as illustrated in FIG. 1E, terminal end body 150 is removed from anchor 125 and placed on torquing post 175B where a predetermined amount of torque is applied to cable clamp 180 using a torque wrench. The predetermined amount of torque is any specific amount of torque sufficient to meet an industry standard, safety standard, or regulatory requirement (e.g., 225 lbs of force). Once the predetermined amount of torque is applied to cable clamp 180, the application of the terminal end to cable 165 is complete.

Figure 6:
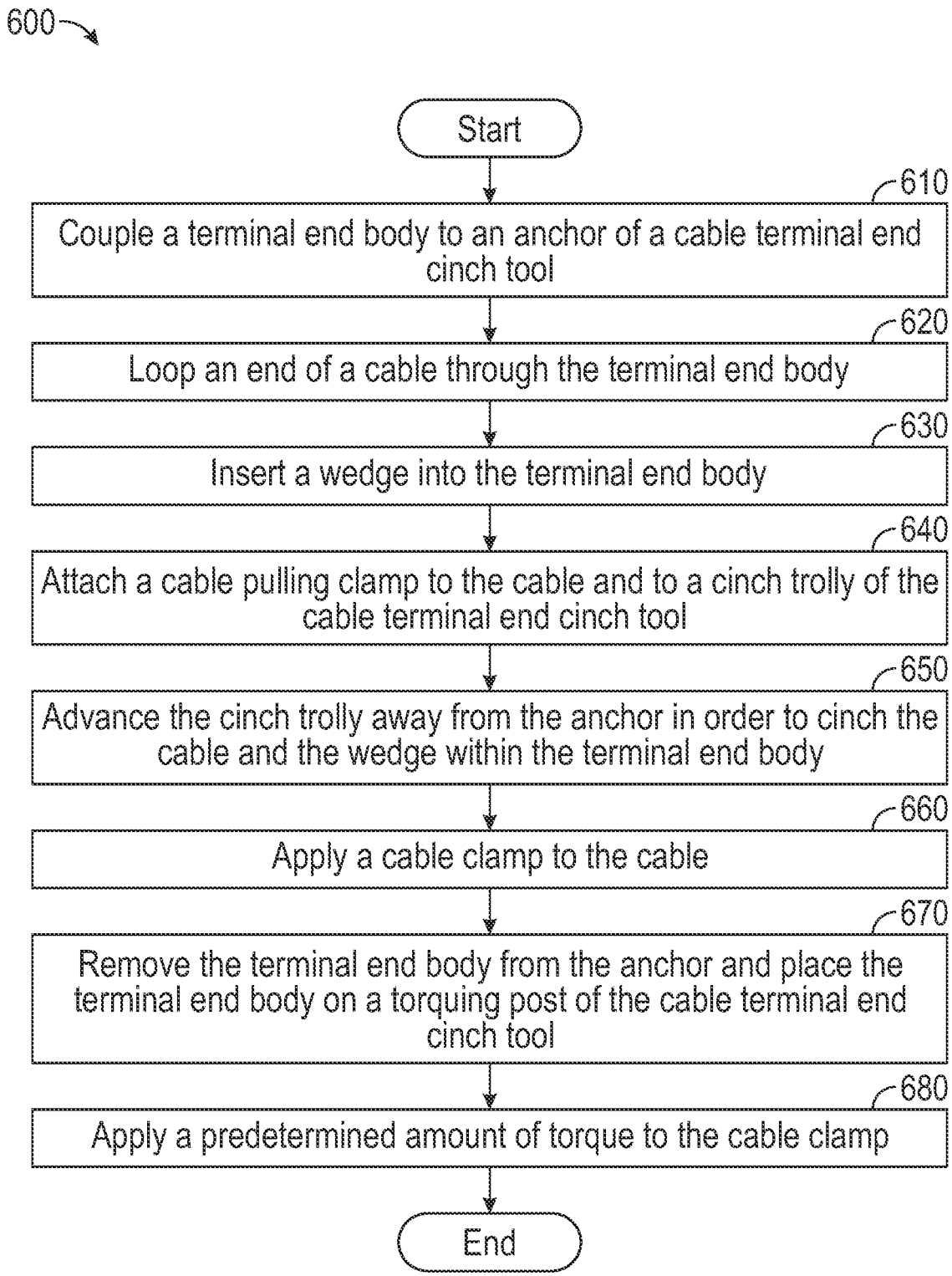
FIG. 6 is a flow diagram of a method of applying a terminal end to a cable, according to certain embodiments.

FIG. 6 is a flow diagram illustrating an example method 600 for applying a terminal end to a cable. Method 600 begins in step 610 where a terminal end body is coupled to an anchor of a cable terminal end cinch tool. In some embodiments, the terminal end body is terminal end body 150 and the anchor is anchor 125 of cable terminal end cinch tool 110. In some embodiments, the terminal end body is coupled to the anchor using a pin such as pin 160.

In step 620, an end of a cable is looped through the terminal end body. In this step, the end of the cable is inserted into through an opening in the terminal end body that is facing the cinch trolly of the cable terminal end cinch tool. In step 630, a wedge such as wedge 155 is inserted into the terminal end body. In some embodiments, the wedge is placed on top of the portion of the cable that is within the terminal end body and then the end of the cable is looped back on top of the wedge and out through the opening of the terminal end body towards the cinch trolly.

In step 640, a cable pulling clamp is attached to the cable and to the cinch trolly of the cable terminal end cinch tool. In some embodiments, the cable pulling clamp is cable pulling clamp 170 and the cinch trolly is cinch trolly 130. In this step, a clamp portion of the cable pulling clamp is attached to the live portion of cable 165, and an attachment point of the cable pulling clamp is attached to a protrusion (e.g., a hook) of the cinch trolly.

In step 650, the cinch trolly is advanced away from the anchor in order to cinch the cable and the wedge within the terminal end body. The cinch trolly may be advanced away from the anchor using different methods. First, a torque tool such as an impact drill may be used to rotate a threaded rod that is threadably coupled to the cinch trolly, thereby advancing the cinch trolly away from the anchor and cinching the cable and the wedge within the terminal end body. The threaded rod may be, for example, threaded rod 135. Second, a pry bar may be used to advance the cinch trolly away from the anchor in order to cinch the cable and the wedge within the terminal end body. In this embodiment, an end of the pry bar is inserted into the attachment point of the cable pulling clamp and then into a hole in a line of holes within a base plate of the cable terminal end cinch tool. The pry bar is then used to manually pry the cinch trolly away from the anchor using the line of holes in the base plate.

In step 660, a cable clamp is applied to the cable. In some embodiments, the cable clamp is cable clamp 180. In some embodiments, the cable clamp is used to couple the dead end of the cable to the wedge. Any appropriate tool such as torque tool 140 may be used to tighten the cable clamp to the cable in this step.

In step 670, the terminal end body is removed from the anchor and placed on a torquing post of the cable terminal end cinch tool. In some embodiments, the torquing post is torquing post 175. In step 680, a predetermined amount of torque is applied to the cable clamp. The predetermined amount of torque may be applied to cable clamp in this step using a torque wrench or any other appropriate tool. The predetermined amount of torque may be any specific amount of torque sufficient to meet an industry standard, safety standard, or regulatory requirement for the particular cable or application. After step 680, method 600 may end.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "member," "module," "device," "unit," "component," "element," "mechanism," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. An apparatus for applying a terminal end of a cable, the apparatus comprising:
   a base plate comprising a threaded rod support;
   a threaded rod inserted through an aperture of the threaded rod support;
   an adapter coupled to a first end of the threaded rod and configured to couple a torque tool to the threaded rod;
   an anchor coupled to the base plate and configured to couple a terminal end body of a cable to the apparatus; and
   a cinch trolly slidebly coupled to the base plate via a groove in the base plate, the cinch trolly comprising:
      a protrusion configured to couple a cable pulling clamp to the cinch trolly; and
      one or more threaded nuts configured to threadably couple the cinch trolly to the threaded rod;
   wherein the cinch trolly is configured to move along the groove away from the anchor when the threaded rod is rotated by the torque tool, thereby pulling the cable away from the anchor via the cable pulling clamp and thereby cinching the cable and a wedge within the terminal end body.

2. The apparatus of claim 1, further comprising a plurality of torquing posts that are each configured to secure the terminal end body while a predetermined amount of torque is applied to a cable clamp attached to the cable.

3. The apparatus of claim 2, wherein the plurality of torquing posts comprises:
   a first torquing post having a first diameter; and
   a second torquing post having a second diameter that is different from the first diameter.

4. The apparatus of claim 2, wherein:
   the plurality of torquing posts are welded to the base plate; or
   the plurality of torquing posts are removably coupled to the base plate.

5. The apparatus of claim 1, wherein:
   the threaded rod support is an angle bracket welded to the base plate; and
   the angle bracket and the anchor are coupled to opposite ends of the base plate.

6. The apparatus of claim 1, wherein:
   the anchor is welded to the base plate; or
   the anchor is removably coupled to the base plate.

7. The apparatus of claim 1, wherein the base plate comprises a plurality of holes configured to allow a bar to be used to manually advance the cable pulling clamp away from the anchor.

8. The apparatus of claim 1, wherein the anchor comprises:
   a plurality of pin apertures, wherein the terminal end body is coupled to the anchor by a pin that is inserted through the terminal end body and the pin apertures; and
   a milled groove that is sized to accept the cable.

9. The apparatus of claim 1, wherein the protrusion is a hook that is aligned with the anchor.

10. The apparatus of claim 1, wherein the cinch trolly comprises:
    an angle bracket;
    a bolt with a locknut configured to secure the cinch trolly to the base plate through the groove; and
    a key coupled to the angle bracket and configured to fit into the groove of the base plate.

11. A system for applying a terminal end of a cable, the system comprising:
    a cable pulling clamp;
    a terminal end body for a cable;
    a wedge configured to be inserted into the terminal end body; and
    a cable terminal end cinch tool comprising:
       a base plate comprising a threaded rod support;
       a threaded rod inserted through an aperture of the threaded rod support;
       an adapter coupled to a first end of the threaded rod and configured to couple a torque tool to the threaded rod;
       an anchor coupled to the base plate and configured to couple the terminal end body to the cable terminal end cinch tool; and
       a cinch trolly slidebly coupled to the base plate via a groove in the base plate, the cinch trolly comprising:
          a protrusion configured to couple the cable pulling clamp to the cinch trolly; and
          one or more threaded nuts configured to threadably couple the cinch trolly to the threaded rod;
    wherein the cinch trolly is configured to move along the groove away from the anchor when the threaded rod is rotated by the torque tool, thereby pulling the cable away from the anchor via the cable pulling clamp and thereby cinching the cable and the wedge within the terminal end body.

12. The system of claim 11, the cable terminal end cinch tool further comprising a plurality of torquing posts that are each configured to secure the terminal end body while a predetermined amount of torque is applied to a cable clamp attached to the cable.

13. The system of claim 11, wherein the base plate comprises a plurality of holes configured to allow a bar to be used to manually advance the cable pulling clamp away from the anchor.

14. The system of claim 11, wherein the cinch trolly comprises:
    an angle bracket;
    a bolt with a locknut configured to secure the cinch trolly to the base plate through the groove; and
    a key coupled to the angle bracket and configured to fit into the groove of the base plate.

15. A method of applying a terminal end to a cable, the method comprising:
    coupling a terminal end body to an anchor of a cable terminal end cinch tool;

looping an end of a cable through the terminal end body;

inserting a wedge into the terminal end body;

attaching a cable pulling clamp to the cable and to a cinch trolly of the cable terminal end cinch tool;

advancing the cinch trolly away from the anchor in order to cinch the cable and the wedge within the terminal end body;

applying a cable clamp to the cable;

removing the terminal end body from the anchor;

placing the terminal end body on a torquing post of the cable terminal end cinch tool; and applying a predetermined amount of torque to the cable clamp.

16. The method of claim 15, wherein advancing the cinch trolly away from the anchor in order to cinch the cable and the wedge within the terminal end body comprises using a torque tool to rotate a threaded rod that is threadably coupled to the cinch trolly.

17. The method of claim 15, wherein advancing the cinch trolly away from the anchor in order to cinch the cable and the wedge within the terminal end body comprises:

coupling a bar to the cinch trolly; and manually prying the cinch trolly away from the anchor using a plurality of holes in a base plate of the cable terminal end cinch tool.

18. The method of claim 15, wherein coupling the terminal end body to the anchor of the cable terminal end cinch tool comprises inserting a pin through the terminal end body and pin apertures of the anchor.

19. The method of claim 15, wherein applying the predetermined amount of torque to the cable clamp comprises utilizing a torque wrench.

20. The method of claim 15, wherein the cable terminal end cinch tool comprises:

a base plate comprising a threaded rod support;

a threaded rod inserted through an aperture of the threaded rod support;

the anchor; and the cinch trolly, wherein the cinch trolly is slidebly coupled to the base plate via a groove in the base plate, the cinch trolly comprising:

a protrusion configured to couple the cable pulling clamp to the cinch trolly; and one or more threaded nuts configured to threadably couple the cinch trolly to the threaded rod.

* * * * *